（12） United States Patent
Hasegawa et al.

(10) Patent No.: US 9,758,168 B2
(45) Date of Patent: Sep. 12, 2017

(54) IDLING STOP DEVICE (71) Applicant: Bosch Corporation, Tokyo (JP)

(72) Inventors: Taichi Hasegawa, Kanagawa (JP);
Shuichi Miyagawa, Kanagawa (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 14/440,445

(22) PCT Filed: Oct. 28, 2013

(86) PCT No.: PCT/JP2013/079130
§ 371 (c)(1),
(2) Date: May 4, 2015

(87) PCT Pub. No.: WO2014/069399
PCT Pub. Date: May 8, 2014

(65) Prior Publication Data
US 2015/0284002 A1    Oct. 8, 2015

(30) Foreign Application Priority Data

Nov. 2, 2012   (JP) ................................ 2012-242872

(51) Int. Cl.
*G06F 7/70*     (2006.01)
*B60W 10/04*    (2006.01)
(Continued)

(52) U.S. Cl.
CPC .......... *B60W 30/181* (2013.01); *B60W 10/06* (2013.01); *B60W 10/188* (2013.01);
(Continued)

(58) Field of Classification Search
USPC .......................................................... 701/70
See application file for complete search history.

(56) References Cited

U.S. PATENT DOCUMENTS 4,852,950 A *   8/1989  Murakami .......... B60T 8/17616
                                            180/197
6,459,980 B1 *  10/2002 Tabata ..................... B60K 6/46
                                            180/65.1
(Continued)

FOREIGN PATENT DOCUMENTS

CN    102166961 A    8/2011
CN    102431530 A    5/2012
(Continued)

OTHER PUBLICATIONS

International Search Report for Application No. PCT/JP2013/079130 dated Feb. 4, 2014 (English Translation, 2 pages).

*Primary Examiner* — Tyler Paige
(74) *Attorney, Agent, or Firm* — Michael Best & Friedrich LLP (57) ABSTRACT A technique for simplifying the structure of an idling stop device. The idling stop device 100 includes a deceleration detector 200 which detects decelerations of a vehicle. The idling stop device 100 also includes an estimation part 350 which acquires, based on the deceleration detected by the deceleration detector 200, first deceleration when a vehicle is decelerated to a preset speed of less. Based on the acquired first deceleration, the estimation part 350 estimates a first brake pressure applied to the vehicle when the vehicle is decelerated to the preset speed or less.

10 Claims, 5 Drawing Sheets (51) Int. Cl.
*B60W 30/18* (2012.01)
*F02N 11/08* (2006.01)
*F02D 29/02* (2006.01)
*F02D 17/04* (2006.01)
*B60W 10/06* (2006.01)
*B60W 10/188* (2012.01)
*B60W 30/192* (2012.01)

(52) U.S. Cl.
CPC .... *B60W 30/18109* (2013.01); *B60W 30/192* (2013.01); *F02D 17/04* (2013.01); *F02D 29/02* (2013.01); *F02N 11/0833* (2013.01); *B60W 2510/182* (2013.01); *B60W 2520/105* (2013.01); *B60W 2550/142* (2013.01); *F02N 2200/0801* (2013.01); *F02N 2200/124* (2013.01); *Y02T 10/48* (2013.01)

(56) References Cited

U.S. PATENT DOCUMENTS

| | | | | |
|---|---|---|---|---|
| 2003/0168266 A1* | 9/2003 | Sasaki | ...................... | B60K 6/48 180/65.25 |
| 2007/0173984 A1* | 7/2007 | Nakayama | ................ | B60T 7/12 701/1 |
| 2011/0112740 A1* | 5/2011 | Hashimoto | ............. | F02D 17/02 701/70 |
| 2011/0256981 A1* | 10/2011 | Saito | ...................... | B60W 10/06 477/183 |
| 2012/0022773 A1* | 1/2012 | Ohmori | ................... | B60T 7/122 701/113 |
| 2012/0142494 A1* | 6/2012 | Yamada | ............... | B60W 10/026 477/175 |
| 2012/0150406 A1* | 6/2012 | Tomura | ................. | B60W 10/06 701/70 |
| 2012/0173057 A1* | 7/2012 | Books | ................... | B60W 50/14 701/22 |

FOREIGN PATENT DOCUMENTS

| | | |
|---|---|---|
| CN | 102444483 A | 5/2012 |
| JP | 2006131121 A | 5/2006 |
| JP | 2006132451 | 5/2006 |
| JP | 2008215293 | 9/2008 |
| JP | 2009131121 | 6/2009 |
| JP | 2009190648 | 8/2009 |
| JP | 2012117419 | 6/2012 |

* cited by examiner

IDLING STOP DEVICE

BACKGROUND OF THE INVENTION

The present invention relates to an idling stop device.

Conventionally, in a vehicle control of an automobile or the like, an idling stop control for realizing saving of fuel and reduction of an exhaust gas is performed where an engine is stopped during parking or stopping of a vehicle, or during a period that a vehicle waits for a change in a traffic signal or the like.

In the idling stop control, it is necessary to prevent sudden starting of a vehicle when an engine is restarted. For this end, in the idling stop control, there may be a case where a condition that a brake torque generated by a brake pressure applied to a vehicle is more than a cranking torque at the time of starting the engine is satisfied, the engine is stopped while maintaining the brake pressure.

In this respect, in the prior art, to acquire a brake pressure applied to a vehicle, various sensors such as a sensor which detects a brake liquid pressure or a sensor which detects a stroke amount of a brake pedal are provided to the vehicle. In the prior art, an amount of brake operation (brake pressure) performed by a driver is detected by the sensor, and an engine is stopped while maintaining a brake liquid pressure when the detected brake pressure is higher than or equal to a predetermined threshold value.

SUMMARY OF THE INVENTION

However, the prior art does not take into account simplifying the constitution of the idling stop device at all.

That is, in the prior art, a brake operation amount (brake pressure) of the driver is detected using a sensor which detects a liquid pressure of a brake or a sensor which detects a stroke amount of a brake pedal. Accordingly, in the prior art, it has been inevitable to mount these various sensors on a vehicle and hence, there have been cases where the constitution of the device becomes complicated.

An idling stop device according to the present invention has been made in view of the above-mentioned drawbacks, and includes: a detection part which detects deceleration of a vehicle; an estimation part which acquires, based on the deceleration detected by the detection part, first deceleration when a vehicle speed is decelerated to a preset speed or less, and estimates a first brake pressure applied to the vehicle when the vehicle is decelerated to the preset speed or less based on the acquired first deceleration; a brake pressure control part which maintains a brake pressure applied to the vehicle when the first brake pressure estimated by the estimation part is higher than or equal to a preset threshold value; and an idling stop control part which stops an engine of the vehicle when the first brake pressure estimated by the estimation part is higher than or equal to the preset threshold value.

That is, in general, a vehicle includes a detection part which detects acceleration (deceleration) of the vehicle. In the present invention, an idling stop control is performed by making use of deceleration detected by the detection part without using a sensor which detects a brake liquid pressure, a sensor which detects a stroke amount of a brake pedal or the like. To be more specific, in the present invention, based on the first deceleration acquired when a vehicle is decelerated to a preset speed or less, a brake pressure (first brake pressure) applied to the vehicle at this point of time is estimated. Accordingly, the idling stop control can be performed without providing various sensors used in the prior art. As a result, according to the present invention, the constitution of the idling stop device can be simplified.

In this case, the estimation part may estimate the brake pressure applied to the vehicle when the vehicle is decelerated to the preset speed or less based on the acquired first deceleration, a weight of the vehicle, and a brake efficiency of the vehicle.

The estimation part may acquire deceleration when the vehicle is decelerated to a speed less than or equal to a speed immediately before the vehicle is stopped as the first deceleration, and estimates a brake pressure applied to the vehicle when the vehicle is decelerated to the speed less than or equal to the speed immediately before the vehicle is stopped based on the acquired first deceleration.

The idling stop device may further include: a gradient detection part which detects deceleration acting on the vehicle corresponding to a gradient of a road surface on which the vehicle travels. In this case, the estimation part estimates, after the vehicle is stopped, a second brake pressure applied to the vehicle based on second deceleration detected by the gradient detection part in a state where the vehicle is being stopped, and outputs a higher brake pressure by comparing the estimated second brake pressure and the first brake pressure, the brake pressure control part maintains the brake pressure applied to the vehicle when the brake pressure outputted from the estimation part is higher than or equal to a preset threshold value, and the idling stop control part can stop the engine of the vehicle when the brake pressure outputted from the estimation part is higher than or equal to the preset threshold value.

Due to such a constitution, it is possible to perform a proper idling stop control which takes into account a gradient of a road surface on which a vehicle travels.

The estimation part may estimate the brake pressure applied to the vehicle based on the second deceleration, a weight of the vehicle and a brake efficiency of the vehicle after the vehicle is stopped.

According to the present invention, the constitution of the idling stop device can be simplified.

DETAILED DESCRIPTION

An embodiment of the present invention is explained by reference to drawings.

Figure 1:
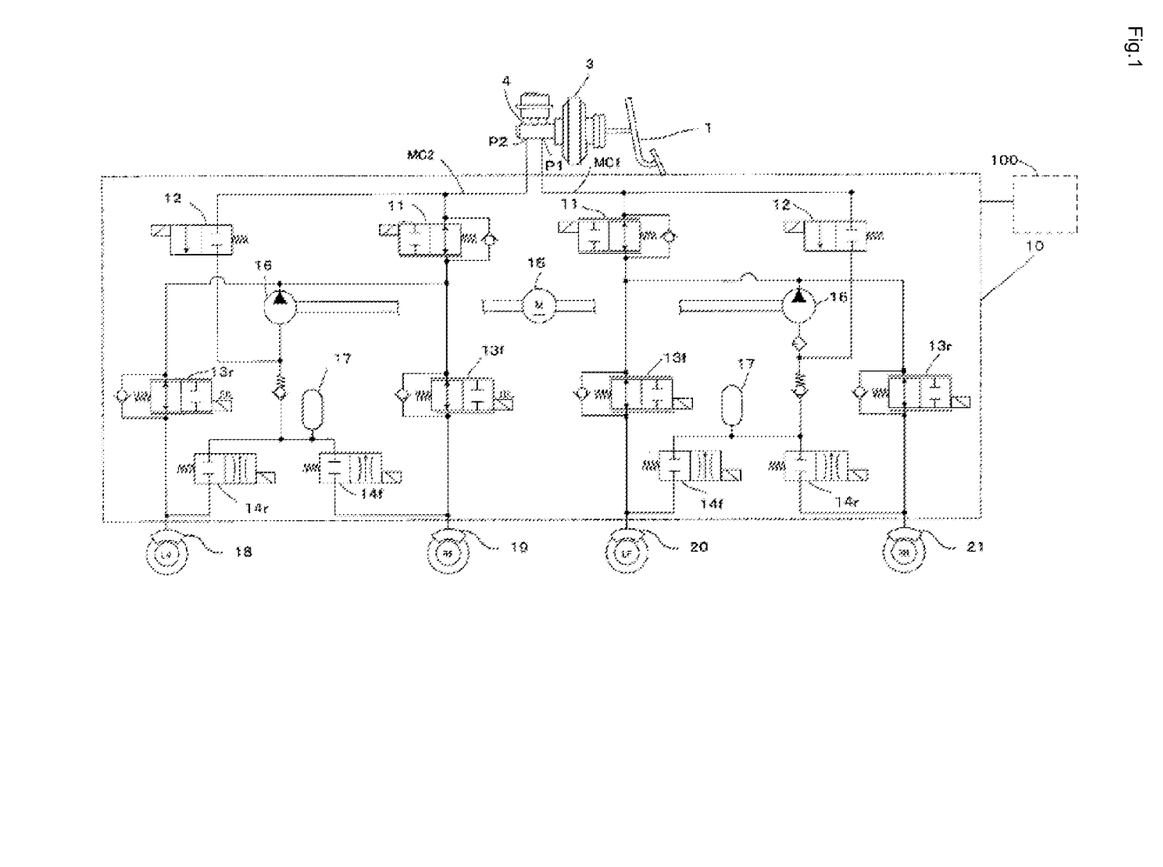
FIG. 1 is a view showing a vehicle-use brake hydraulic circuit according to one embodiment of the present invention.

Firstly, using FIG. 1, the schematic constitution of a brake hydraulic circuit in a vehicle to which an idling stop device of the present invention is applied is explained.

As shown in FIG. 1, the brake hydraulic circuit of this embodiment is a so-called hydraulic circuit of an X-type pipe system which includes two brake systems, and one front wheel and one rear wheel disposed at a position diagonal to the front wheel are subjected to braking as a pair in each system. However, the present invention is not limited to such a hydraulic circuit. Further, although this embodiment will be explained by taking a four-wheeled vehicle as one example, the present invention is not limited to a four wheeled vehicle, and is broadly applicable to vehicles including a two-wheeled vehicle.

In the hydraulic circuit 10 shown in FIG. 1, a stepping force applied to a brake pedal 1 is amplified by a booster 3, and a boosted stepping force is transmitted to a master cylinder 4 which constitutes a liquid pressure generation source. Two pressurization chambers are formed in the inside of the master cylinder 4 in a partitioned manner by being partitioned by a primary piston and secondary piston not shown in the drawing. The respective pistons are pushed in response to a brake pedal operation, and a brake liquid is moved to the inside of the hydraulic circuit 10 through liquid pressure ports P1, P2 communicating with the respective pressurization chambers.

The booster 3 is, for example, a pneumatic booster. The booster 3 is connected to a brake pedal 1 side by way of an input rod (not shown in the drawing), and an amplified stepping force is transmitted to the master cylinder 4 by way of a push rod (not shown in the drawing) connected to the primary piston. In the same manner as a conventional booster, the booster 3 has a so-called jump-in characteristic. That is, a predetermined gap (in other words, a jump-in region) is formed between the input rod and a reaction disk mounted on the push rod so as to form a region where a reaction force is minimized before an input rod of the booster 3 is mechanically connected to a push rod of the master cylinder 4.

Brake pipe passages MC1, MC2 extend toward wheel cylinders of the respective wheels (RF, LR, LF, RR) from liquid pressure ports P1, P2 of the master cylinder 4. As described previously, the hydraulic circuit in the brake device of this embodiment is a hydraulic circuit of an X-type pipe system. In the example shown in FIG. 1, the hydraulic circuit 10 is configured such that a brake liquid is supplied to the wheel cylinder of a right front wheel (RF) hydraulic brake 19 and the wheel cylinder of a left rear wheel (LR) hydraulic brake 18 through the brake pipe passage MC2. On the other hand, the hydraulic circuit 10 is also configured such that a brake liquid is supplied to the wheel cylinder of a left front wheel (LF) hydraulic brake 20 and the wheel cylinder of a right rear wheel (RR) hydraulic brake 21 through the brake pipe passage MC1. Due to such a constitution, by operating the wheel cylinders using a liquid pressure, the respective brakes 18, 19, 20, 21 can apply a braking force to the wheel.

The hydraulic circuit of each system includes, as electromagnetic valves, a normally-open linearly-controllable circuit control valve 11, a normally-closed ON-OFF controlled suction valve 12, normally-open linearly-controllable booster valves 13f, 13r, and normally-closed ON-OFF controlled pressure reduction valves 14f, 14r. The hydraulic circuit of each system also includes a pump 16 driven by a pump motor 15, and a low-pressure accumulator 17.

The hydraulic circuit of the system having the brake pipe passage MC1 and the hydraulic circuit of the system having the brake pipe passage MC2 are substantially equal to each other. Accordingly, the hydraulic circuit of the system having the brake pipe passage MC2 is explained as a representative example.

The circuit control valve 11 is a valve disposed so as to establish or interrupt the communication between the master cylinder 4 and the booster valves 13f, 13r. The circuit control valve 11 is used at the time of maintaining or releasing a brake pressure applied to the vehicle in an idling stop control. To be more specific, the hydraulic circuit 10 is connected with the idling stop device 100, and receives a valve opening/closing control signal outputted from the idling stop device 100. The circuit control valve 11 maintains or releases a brake pressure applied to the vehicle by opening or closing the valve in response to a valve opening/closing control signal outputted from the idling stop device 100.

The suction valve 12 is a valve disposed so as to establish or interrupt the communication between the master cylinder 4 and a suction side of the pump 16.

The booster valve 13f and the pressure reduction valve 14f are disposed adjacent to the right front wheel hydraulic brake 19. The booster valve 13f and the pressure reduction valve 14f are used for an ABS control of the right front wheel hydraulic brake 19. The booster valve 13r and the pressure reduction valve 14r are disposed adjacent to the left rear wheel hydraulic brake 18. The booster valve 13r and the pressure reduction valve 14r are used for an ABS control of the left rear wheel hydraulic brake 18.

The booster valve 13f is disposed between the circuit control valve 11 and the right front wheel hydraulic brake 19. The booster valve 13f is linearly controllable so as to continuously adjust a flow rate of a brake liquid to a wheel cylinder side of the right front wheel hydraulic brake 19 from the master cylinder 4 and a circuit control valve 11 side. The booster valve 13f is provided with a bypass flow passage having a check valve which, in a state where the booster valve 13f is closed, allows the flow of a brake liquid to the master cylinder 4 and a circuit control valve 11 side from a right front wheel hydraulic brake 19 side and prevents the flow of the brake liquid in the reverse direction.

The pressure reduction valve 14f is a solenoid valve which can perform only full opening or full closing thereof, and is disposed between the wheel cylinder of the right front wheel hydraulic brake 19 and the accumulator 17. The pressure reduction valve 14f is configured to reduce a pressure of a brake liquid supplied to the wheel cylinder of the right front wheel hydraulic brake 19 when the pressure reduction valve 14f is opened. The pressure reduction valve 14f can adjust a flow rate of a brake liquid flown into the accumulator 17 from the wheel cylinder of the right front wheel hydraulic brake 19 by intermittently repeating opening and closing of the valve.

The booster valve 13r is disposed between a pipe passage which connects the circuit control valve 11 and the booster valve 13f to each other and the wheel cylinder of the left rear wheel hydraulic brake 18. The booster valve 13r is linearly controllable so as to continuously adjust a flow rate of a brake liquid to a wheel cylinder side of the left rear wheel hydraulic brake 18 from the master cylinder 4, the circuit control valve 11, the booster valve 13f and a wheel cylinder side of the right front wheel hydraulic brake 19. The booster valve 13r is provided with a bypass flow passage having a check valve which, in a state where the booster valve 13r is closed, allows the flow of a brake liquid to a right front wheel hydraulic brake 19 side from a left rear wheel hydraulic brake 18 side and prevents the flow of the brake liquid in the reverse direction.

The pressure reduction valve 14r on a left rear wheel side is a solenoid valve which can perform only full opening or full closing thereof, and is disposed between the wheel cylinder of the left rear wheel hydraulic brake 18 and the accumulator 17. The pressure reduction valve 14r is configured to reduce a pressure of a brake liquid supplied to the wheel cylinder of the left rear wheel hydraulic brake 18 by supplying the brake liquid to the accumulator 17 when the pressure reduction valve 14r is opened. The pressure reduction valve 14r can adjust a flow rate of a brake liquid flown into the accumulator 17 from the wheel cylinder of the left rear wheel hydraulic brake 18 by intermittently repeating opening and closing of the valve.

Hereinafter, respective embodiments of the idling stop device according to the present invention are explained.

Figure 2:
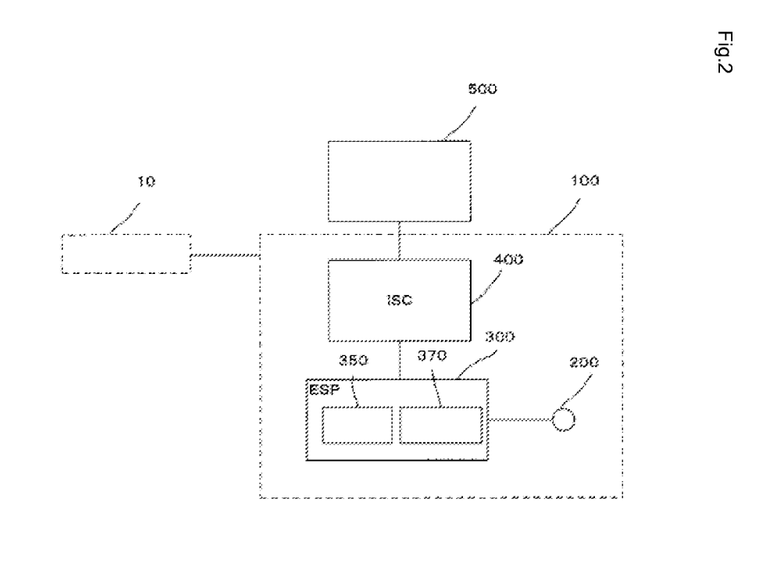
FIG. 2 is a block diagram of an idling stop device according to a first embodiment of the present invention.

FIG. 2 is a block diagram of the idling stop device according to the first embodiment of the present invention. As shown in FIG. 1, the idling stop device 100 according to the first embodiment is connected to the hydraulic circuit 10 and the engine 500 of the vehicle. The idling stop device 100 performs an idling stop control of the engine 500.

The idling stop device 100 includes a deceleration detector (detection part) 200, an ESP (Electronic Stability Program) 300, and an ISC (Idling Stop Controller (idling stop control part)) 400.

The deceleration detector 200 detects the deceleration of the vehicle. The detector 200 may be formed of an acceleration sensor, for example. The deceleration detector 200 detects the deceleration of a vehicle including deceleration of the vehicle when the vehicle is decelerated to a preset speed or less (first deceleration). To be more specific, the deceleration detector 200 detects the deceleration of a vehicle including deceleration when the vehicle is decelerated to a speed immediately before the vehicle is stopped (3 Km/h, for example) or less (first deceleration). The deceleration detector 200 is not limited to an acceleration sensor. For example, the deceleration detector 200 may be an arithmetic logic unit which acquires deceleration of a vehicle by differentiating a vehicle speed outputted from a sensor which detects a speed of the vehicle by time.

The ESP 300 is a skid prevention system which suppresses a skid or the like which cannot be prevented only with a drive operation by a driver when the posture of the vehicle comes out of balance thus stabilizing the posture of the vehicle. The ESP 300 includes an estimation part 350 and a brake pressure control part 370.

The estimation part 350 acquires the first deceleration when a speed of the vehicle is decelerated to a preset speed (3 Km/h, for example) or less based on deceleration detected by the deceleration detector 200. To be more specific, the estimation part 350 acquires the deceleration when a speed of the vehicle is decelerated to a preset speed (3 Km/h, for example) or less out of decelerations sequentially outputted from the deceleration detector 200 as the first deceleration.

The estimation part 350 estimates a brake pressure applied to the vehicle when the vehicle is decelerated to a preset speed or less based on the acquired first deceleration. The estimation part 350 estimates a brake pressure applied to the vehicle based on the following numerical formula 1 expressing an equation of motion, for example.

$$F_{flat} = ma \quad \text{[Numerical formula 1]}$$

wherein, $F_{flat}$ is a product of a brake pressure (bar) of a vehicle on a flat ground and a brake efficiency (Nm/bar) of the vehicle, m is a weight of the vehicle, and a is deceleration of the vehicle.

That is, the brake efficiency of the vehicle and a weight of the vehicle are known values. Therefore, the estimation part 350 can acquire a brake pressure applied to the vehicle on a flat ground by substituting deceleration detected by the deceleration detector 200 for a in the numerical formula 1. Accordingly, the estimation part 350 can estimate a brake pressure applied to the vehicle when a speed of the vehicle is decelerated to a preset speed (3 Km/h, for example) or less.

The brake pressure control part 370 maintains a brake pressure applied to the vehicle when a brake pressure estimated by the estimation part 350 is higher than or equal to a preset threshold value. To be more specific, the brake pressure control part 370 transmits a valve opening/closing control signal to the hydraulic circuit 10 when the brake pressure estimated by the estimation part 350 is higher than or equal to the preset threshold value. The hydraulic circuit 10 maintains a brake pressure applied to the vehicle by closing the circuit control valve 11 based on a valve opening/closing control signal outputted from the ESP 300.

ISC 400 stops the engine 500 of the vehicle when the brake pressure estimated by the estimation part 350 is higher than or equal to a preset threshold value (the value capable of being suitably set corresponding to a condition of the vehicle such as 5 bar or 10 bar, for example).

That is, to prevent sudden starting of the vehicle when the engine 500 is restarted after an idling stop, ISC 400 stops the engine 500 in a case where a condition that a brake torque generated by a brake pressure applied to the vehicle is more than a cranking torque at the time of starting the engine 500 is satisfied, and the brake pressure control part 370 maintains the brake pressure.

Figure 3:
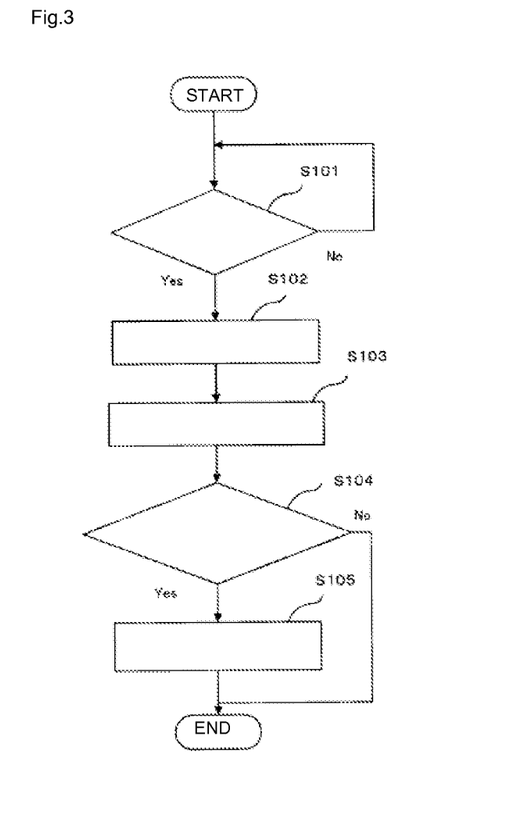
FIG. 3 is a flowchart of a control executed by the idling stop device according to the first embodiment.

Next, the flow of a control executed by the idling stop device according to the first embodiment is explained. FIG. 3 is a flowchart of a control executed by the idling stop device.

As shown in FIG. 3, the estimation part 350 determines whether or not a speed of the vehicle is decelerated to 3 Km/h or less (step S101). When the estimation part 350 determines that the speed of the vehicle is not decelerated to 3 Km/h or less (No in step S101), the processing in step S101 is repeated.

On the other hand, when the estimation part 350 determines that the speed of the vehicle is decelerated to 3 Km/h or less (Yes in step S101), the estimation part 350 acquires the first deceleration when the speed of the vehicle is decelerated to 3 Km/h or less (step S102).

Subsequently, the estimation part 350 estimates a first brake pressure applied to a vehicle when a speed of the vehicle is decelerated to 3 Km/h or less based on the first deceleration acquired in step S102 (step S103). To be more specific, the estimation part 350 estimates a brake pressure using the above-mentioned numerical formula 1.

Subsequently, the ESP 300 determines whether or not first brake pressure estimated in step S103 is higher than or equal to a preset threshold value (5 bar, for example) (step S104). When the ESP 300 determines that the estimated first brake pressure is not more than a preset threshold value (No in step S104), the processing is finished.

On the other hand, when the ESP 300 determines that the first brake pressure estimated by the estimation part 350 is higher than or equal to the preset threshold value (Yes in step S104), the ISC 400 stops the engine 500 (step S105) and makes the brake pressure control part 370 maintain the brake pressure. To be more specific, the brake pressure control part 370 transmits a valve opening/closing control signal to the hydraulic circuit 10 so that the circuit control valve 11 is "closed". As a result, a liquid pressure applied to the respective brakes 18, 19, 20, 21 is confined in the inside of the brake pipe passages MC1, MC2 and hence, a brake pressure in the respective brakes 18, 19, 20, 21 is maintained. The ISC 400 outputs a control signal for stopping the engine 500.

As described above, the first embodiment is configured such that first deceleration when the vehicle is decelerated to a preset speed or less is acquired based on deceleration detected by the acceleration (deceleration) detection part generally mounted on the vehicle, and the first brake pressure applied to the vehicle when the vehicle is decelerated to a preset speed or less is estimated based on the acquired first deceleration. Accordingly, according to the first embodiment, an idling stop control can be performed without using a sensor which detects a brake liquid pressure, a sensor which detects a stroke amount of a brake pedal or the like. As a result, according to the first embodiment, the idling stop control can be performed without providing various sensors used in the prior art and hence, the constitution of the idling stop device can be simplified.

Figure 4:
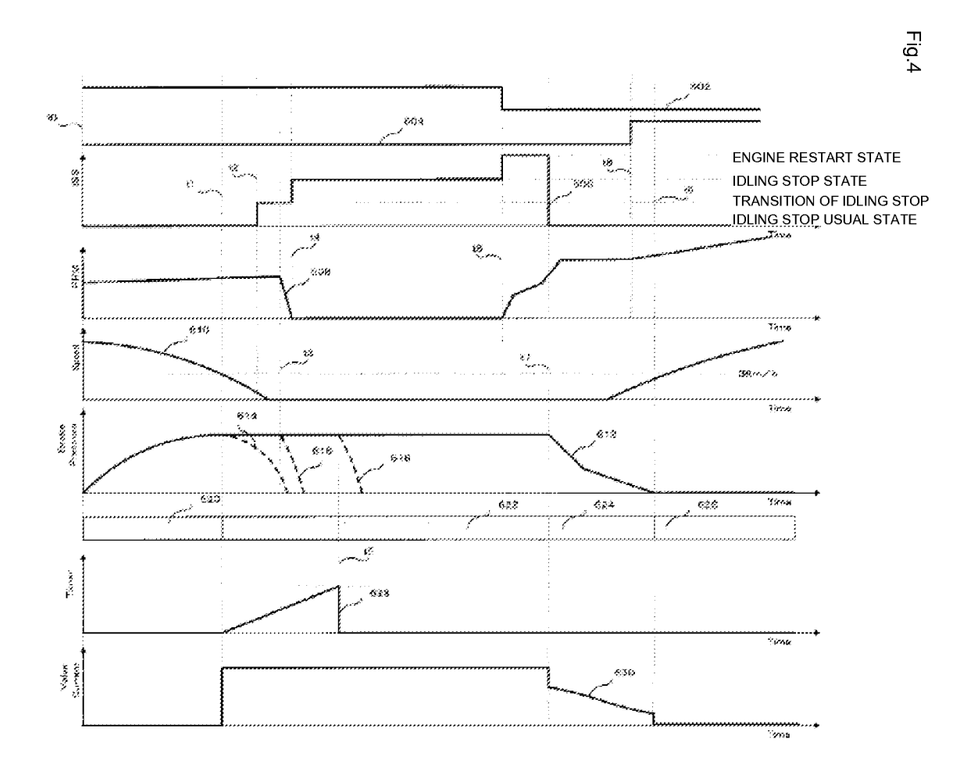
FIG. 4 is a time chart showing states of various parts of a vehicle when an idling stop control is executed.

A timing chart showing states of various parts of the vehicle when an idling stop control is executed is explained by reference to FIG. 4. FIG. 4 shows, in a descending order from the top, a graph 602 indicating a stepping state of the brake pedal 1 of the vehicle, a graph 604 showing a stepping state of an acceleration pedal of the vehicle, a graph 606 showing a state of an idling stop control, a graph 608 showing a rotational speed of the engine, a graph 610 showing a speed of the vehicle, a graph 612 showing a brake pressure applied to the vehicle, graphs 620, 622, 624, 626 showing operation states of the brake in the idling stop control, a graph 628 showing a state of a timer, and a graph 630 indicating a state of an electric current supplied to the circuit control valve 11.

During a period from a point of time t0 to a point of time t1, corresponding to stepping of the brake pedal 1, as indicated by the graphs 610, 612, a brake pressure is increased and a vehicle speed is decelerated. During a period from the point of time t0 to the point of time t1, an operation state of the brake in an idling stop control assumes "standby state 620", that is, a usual brake state.

Assume that a speed of the vehicle is decelerated to a speed of 3 Km/h or less at the point of time t1. At this stage of operation, the estimation part 350 estimates a brake pressure applied to the vehicle as described above. Then, the ESP 300 determines whether or not the estimated brake pressure is higher than or equal to a preset threshold value. Here, assume that the estimated brake pressure is determined to be higher than or equal to a preset threshold value. In this case, the brake pressure control part 370 transmits a valve opening/closing control signal to the hydraulic circuit 10 so as to make the hydraulic circuit 10 close the circuit control valve 11. As indicated by the graph 630, by starting the supply of an electric current to the circuit control valve 11, the hydraulic circuit 10 controls the circuit control valve 11 shown in FIG. 1 to "closed" from "open". Due to such an operation, as indicated by the graph 612, a brake pressure applied to the vehicle (pressure applied to the brake wheel) is maintained and hence, an operation state of the brake in the idling stop control assumes "brake pressure maintaining state 622".

When it is determined that the estimated brake pressure is higher than or equal to a preset threshold value, the ISC 400 outputs a control signal for stopping the engine. Accordingly, at a point of time t2, the idling stop control assumes an idling stop transition state as indicated by the graph 606, and the engine is stopped at a point of time t3 as indicated by the graph 608. Then, at the point of time t4, the idling stop control assumes an idling stop state as indicated by the graph 606.

When a driver separates his foot from the brake pedal 1 as indicated by the graph 614 in the idling stop transition state, the ISC 400 considers that a driver has no intention of stopping the vehicle, and the ISC 400 releases a maintained brake pressure (a pressure applied to the brake wheel) as indicated by the graph 616.

Further, as indicated by the graph 628, a timer performs counting from the point of time t1 at which a speed of the vehicle is decelerated to 3 Km/h or less. Then, for example, when an idling stop control is not executed even when a preset time from the point of time t1 to a point of time t5 elapses, a maintained brake pressure (a pressure applied to the brake wheel) is released as indicated by the graph 618.

On the other hand, assume that the driver separates his foot from the brake pedal 1 at a point of time t6 in a state where an idling stop control is being executed. Due to such an operation, as indicated by the graph 606, the idling stop control assumes an engine restart state and hence, the engine is restarted as indicated by the graph 608.

At this stage of operation, the brake pressure (the pressure applied to the brake wheel) is maintained and hence, a brake torque is more than a cranking torque at the time of starting the engine whereby the vehicle is kept in a stopped state.

Then, at a point of time t7, the idling stop control assumes a usual state, that is, a state where an idling stop is released. Accordingly, the brake pressure control part 370 gradually controls the circuit control valve 11 shown in FIG. 1 from "closed" to "open" as indicated by the graph 630. Due to such a control, an operation state of the brake in the idling stop control assumes "release state 624" where the brake pressure (the pressure applied to the brake wheel) is gradually decreased as indicated by the graph 612. On the other hand, a rotational speed of the engine is gradually increased as indicated by the graph 608.

During a period from the point of time t7 to a point of time t8, when a cranking torque of the engine becomes larger than a brake torque as indicated by the graph 610, the vehicle starts moving. Then, when a driver steps in an acceleration pedal as indicated by the graph 604 at a point of time t8, a rotational speed of the engine is increased as indicated by the graph 608 and hence, a speed of the vehicle is also increased as indicated by the graph 610.

At a point of time t9, when the circuit control valve 11 is controlled to a completely "open" state by the brake pressure control part 370 as indicated by the graph 630, the maintained brake pressure (the pressure applied to the brake wheel) is completely released, and an operation state of the brake in the idling stop control assumes "standby state 626".

Next, the second embodiment of the present invention is explained. An idling stop device of the second embodiment has the substantially same constitution and functions as the idling stop device of the first embodiment. The idling stop device of the second embodiment also performs an idling stop control by taking into consideration a gradient of a road in a vehicle stopped state in addition to the constitution and functions of the idling stop device of the first embodiment. Accordingly, in the second embodiment, the explanation of the constitution and functions substantially equal to the constitution and the functions of the first embodiment is omitted.

In the second embodiment, a deceleration detector (detection part) 200 also has a function of a gradient detection part which detects deceleration applied to a vehicle corresponding to a gradient of a road surface on which the vehicle travels. That is, in the case where the vehicle is being stopped on a road surface having a gradient, even when the vehicle per se is stopped, deceleration is detected due to the influence exerted by gravitational acceleration. The deceleration detector 200 detects deceleration generated due to the influence exerted by gravitational acceleration.

Then, an estimation part 350 estimates a brake pressure applied to the vehicle based on second deceleration detected by the deceleration detector 200 in a state where the vehicle is being stopped after the vehicle is stopped. That is, when the vehicle is being stopped on a road surface having a gradient, assuming an angle formed by intersecting of the vertical direction and the advancing direction of the vehicle as θ, a value corresponding to g cos θ is outputted from the deceleration detector 200. Here, g is gravitational acceleration.

An estimation part 350 estimates a brake pressure applied to a vehicle being stopped on a road surface having a gradient based on the following numerical formula 2.

$$F_{slope} = ma'$$ [Numerical formula 2]

wherein, $F_{slope}$ is a product of a brake pressure (bar) of a vehicle on a road surface having a gradient and a brake efficiency (Nm/bar) of the vehicle, m is a weight of the vehicle, and a' is deceleration of the vehicle corresponding to g cos θ outputted from the deceleration detector 200.

That is, a brake efficiency of the vehicle and a weight of the vehicle are known values. Accordingly, the estimation part 350 can acquire a brake pressure applied to the vehicle on a road surface having a gradient by substituting the second deceleration outputted from the deceleration detector 200 for a' in the numerical formula 2. Accordingly, after the vehicle is stopped, the estimation part 350 can estimate a brake pressure applied to the vehicle based on the second deceleration detected by the deceleration detector 200 in a vehicle stopped state.

Figure 5:
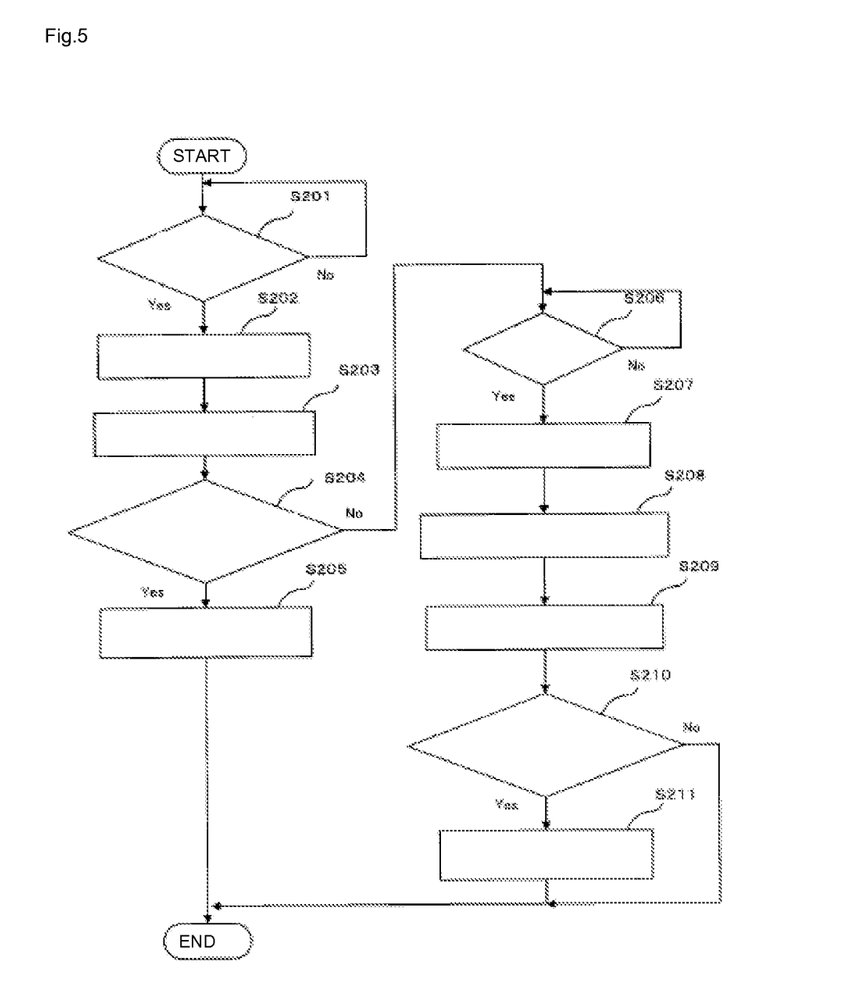
FIG. 5 is a flowchart of a control executed by an idling stop device according to a second embodiment.

Next, the flow of a control executed by the idling stop device according to the second embodiment is explained. FIG. 5 is a flowchart of a control executed by the idling stop device according to the second embodiment.

As shown in FIG. 5, step S201 to step S205 are substantially equal to step S101 to step S105 in the first embodiment and hence, the detailed explanation of these steps is omitted.

In step S204, when it is determined that an estimated first brake pressure is not more than a preset threshold value (No in step S204), the estimation part 350 determines whether or not the vehicle is being stopped (step S206). When the estimation part 350 determines that the vehicle is not being stopped (No in step S206), the estimation part 350 repeats the processing in step S206.

On the other hand, when the estimation part 350 determines that the vehicle is being stopped (Yes in step S206), the estimation part 350 acquires second deceleration (a'), that is, a gradient of a road surface from the deceleration detector 200 (step S207).

Subsequently, the estimation part 350 estimates a second brake pressure applied to a vehicle in a stopped state based on the second deceleration (a') acquired in step S207, that is, a gradient of a road surface (step S208). To be more specific, the estimation part 350 estimates a brake pressure using the above-mentioned numerical formula 2.

Subsequently, the estimation part 350 compares the first brake pressure estimated in step S203 and the second brake pressure estimated in step S208 to each other, and outputs the higher brake pressure to an ISC 400 (step S209).

Subsequently, the ISC 400 determines whether or not the brake pressure outputted in step S209 is higher than or equal to a preset threshold value (5 bar, for example) (step S210). When the ISC 400 determines that the estimated brake pressure is not more than a preset threshold value (No in step S210), the processing is finished.

On the other hand, when the ISC 400 determines that the estimated brake pressure is higher than or equal to the preset threshold value (Yes in step S210), the ISC 400 stops the engine 500 (step S211).

The brake pressure control part 370 transmits a valve opening/closing control signal to the hydraulic circuit 10 when the estimated brake pressure is higher than or equal to the preset threshold value. The hydraulic circuit 10 maintains a brake pressure applied to the vehicle by closing the circuit control valve 11 based on a valve opening/closing control signal outputted from the brake pressure control part 370. To be more specific, the brake pressure control part 370 transmits an opening/closing control signal to the hydraulic circuit 10 so as to make the hydraulic circuit 10 "close" the circuit control valve 11. As a result, a liquid pressure applied to the respective brakes 18, 19, 20, 21 is confined in the inside of the brake pipe passages MC1, MC2 and hence, a brake pressure in the respective brakes 18, 19, 20, 21 is maintained. The ISC 400 outputs a control signal for stopping the engine 500.

As has been described heretofore, in the second embodiment, in addition to the first embodiment, even when it is determined that an idling stop control is not performed at an estimated first brake pressure, a second brake pressure is estimated by taking into consideration that the first brake pressure is influenced by gravitational acceleration in a state where a vehicle is being stopped on a road surface having a gradient. Then, when the estimated second brake pressure is more than a preset value, an idling stop control is performed. In this manner, according to the second embodiment, in addition to the advantageous effect acquired by the first embodiment, it is possible to perform an idling stop control more appropriately when a vehicle is being stopped on a road surface having a gradient.

REFERENCE SIGNS LIST

11: circuit control valve
100: idling stop device
200: deceleration detector (detection part)
300: ESP
350: estimation part
370: brake pressure control part
400: ISC (Idling Stop Controller (idling stop control part)
500: engine

What is claimed is:

1. An idling stop device comprising:
a detection part, the detection part being a vehicle speed sensor mounted to a vehicle which detects a deceleration of the vehicle;
a control unit which acquires, based on the deceleration detected by the detection part, a first deceleration when a vehicle speed is decelerated to a preset speed or less, and wherein the control unit estimates a first brake pressure applied to the vehicle when the vehicle is decelerated to the preset speed or less based on the acquired first deceleration;
a brake pressure control part which maintains a brake pressure applied to the vehicle when the first brake pressure estimated by the control unit is higher than or equal to a preset threshold value; and
an idling stop control part which stops an engine of the vehicle when the first brake pressure estimated by the control unit is higher than or equal to the preset threshold value.

2. The idling stop device according to claim 1, wherein the control unit estimates the brake pressure applied to the vehicle when the vehicle is decelerated to the preset speed or less based on the acquired first deceleration, a weight of the vehicle, and a brake efficiency of the vehicle.

3. The idling stop device according to claim 1, wherein the control unit acquires deceleration when the vehicle is decelerated to a speed less than or equal to a speed immediately before the vehicle is stopped as the first deceleration, and estimates a brake pressure applied to the vehicle when the vehicle is decelerated to the speed less immediately before the vehicle is stopped based on the acquired first deceleration.

4. The idling stop device according to claim 1, further comprising: a gradient detection part which detects deceleration acting on the vehicle corresponding to a gradient of a road surface on which the vehicle travels, wherein
the control unit estimates, after the vehicle is stopped, a second brake pressure applied to the vehicle based on second deceleration detected by the gradient detection part in a state where the vehicle is being stopped, and outputs a higher brake pressure by comparing the estimated second brake pressure and the first brake pressure to each other,
the brake pressure control part maintains the brake pressure applied to the vehicle when the brake pressure outputted from the control unit is higher than or equal to a preset threshold value, and
the idling stop control part stops the engine of the vehicle when the brake pressure outputted from the control unit is higher than or equal to the preset threshold value.

5. The idling stop device according to claim 4, wherein the control unit estimates the brake pressure applied to the vehicle based on the second deceleration, a weight of the vehicle and a brake efficiency of the vehicle after the vehicle is stopped.

6. The idling stop device according to any claim 1, wherein the brake pressure control part maintains the brake pressure applied to the vehicle by closing a valve provided to a brake pipe passage through which a master cylinder constituting a generation source of a brake liquid pressure applied to the vehicle and a wheel cylinder of a wheel communicate with each other.

7. The idling stop device according to claim 2, wherein the control unit acquires deceleration when the vehicle is decelerated to a speed less than or equal to a speed immediately before the vehicle is stopped as the first deceleration, and estimates a brake pressure applied to the vehicle when the vehicle is decelerated to the speed less immediately before the vehicle is stopped based on the acquired first deceleration.

8. The idling stop device according to claim 7, further comprising: a gradient detection part which detects deceleration acting on the vehicle corresponding to a gradient of a road surface on which the vehicle travels, wherein
the control unit estimates, after the vehicle is stopped, a second brake pressure applied to the vehicle based on second deceleration detected by the gradient detection part in a state where the vehicle is being stopped, and outputs a higher brake pressure by comparing the estimated second brake pressure and the first brake pressure to each other,
the brake pressure control part maintains the brake pressure applied to the vehicle when the brake pressure outputted from the control unit is higher than or equal to a preset threshold value, and
the idling stop control part stops the engine of the vehicle when the brake pressure outputted from the control unit is higher than or equal to the preset threshold value.

9. The idling stop device according to claim 8, wherein the control unit estimates the brake pressure applied to the vehicle based on the second deceleration, a weight of the vehicle and a brake efficiency of the vehicle after the vehicle is stopped.

10. The idling stop device according to any claim 9, wherein the brake pressure control part maintains the brake pressure applied to the vehicle by closing a valve provided to a brake pipe passage through which a master cylinder constituting a generation source of a brake liquid pressure applied to the vehicle and a wheel cylinder of a wheel communicate with each other.

* * * * *